(12) United States Patent
Grobman

(10) Patent No.: US 7,334,145 B2
(45) Date of Patent: Feb. 19, 2008

(54) PREDICTIVE PROCESSOR SPEED GOVERNOR

(75) Inventor: Steven L. Grobman, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 348 days.

(21) Appl. No.: 10/862,980

(22) Filed: Jun. 7, 2004

(65) Prior Publication Data

US 2005/0273636 A1    Dec. 8, 2005

(51) Int. Cl.
*G06F 1/00* (2006.01)

(52) U.S. Cl. ............ 713/322; 713/300; 713/320; 713/321; 713/323; 700/28; 700/32; 700/108; 700/174

(58) Field of Classification Search ......... 713/300–340
See application file for complete search history.

(56) References Cited

U.S. PATENT DOCUMENTS

| | | | | |
|---|---|---|---|---|
| 5,958,058 A | * | 9/1999 | Barrus | 713/320 |
| 6,801,709 B1 | * | 10/2004 | Park | 386/68 |
| 6,865,685 B2 | * | 3/2005 | Hammond et al. | 713/340 |

* cited by examiner

*Primary Examiner*—Rehana Perveen
*Assistant Examiner*—James F. Sugent
(74) *Attorney, Agent, or Firm*—Sharmini N. Green

(57) ABSTRACT

A processor-based system accessing a performance profile for a program executing on a predetermined data set, executing the program on the predetermined data set, and governing processor speed in a predictive manner based at least in part on the performance profile.

20 Claims, 2 Drawing Sheets

PREDICTIVE PROCESSOR SPEED GOVERNOR

BACKGROUND

Mobile processor-based systems such as laptop computers and handheld computers, and other processor-based devices such as mobile phones and game consoles, can offer improved power performance using a processor speed governor or processor frequency governor. In a typical situation, a processor such as an Intel Pentium® M processor with Intel SpeedStep® technology has a frequency governor that may be controlled by an operating system. In one mode of operation, an automatic configuration of the frequency governor raises or lowers the clock frequency at which the processor operates based on a recently sampled level of utilization of the processor. Typically, the governor analyzes processor utilization at regular intervals, such as 250 ms, dropping the frequency in response to high-idle periods, and raising it in response to high-utilization periods, as depicted in FIG. 1. In FIG. 1, a graph of processor utilization when a program is executed on an ungoverned system is shown at 140. Superimposed on the graph is a typical response of a frequency governor to the execution of the program on a governed system, 120. As may be seen from the figure, this method provides a coarse relationship between processor frequency and the capacity required by the programs executing on the system. Because the frequency governor lags the actual behavior of the program and because the changes in frequency therefore only occur at relatively large intervals, the actual frequency may lag the required capacity significantly. As the figure illustrates, a quick increase in utilization may only be met with a corresponding increase in frequency after a substantial interval has already elapsed and the processor needs of the program have started to fall, 160. Alternatively, the processor frequency may stay high, unnecessarily draining power, long after the need for high processor capacity has already fallen off, 180.

In order to improve battery life, it is generally considered advantageous for a frequency governor to lower processor frequency to the minimal available frequency level that exceeds the frequency required to prevent processor saturation. In an ideal scenario, this would be possible if the future processor utilization of the system were known. However, in general, for an arbitrary program executing on a processor-based system, predicting the expected utilization of the processor for the execution of the program is difficult or infeasible, because the past performance of an application is not always a good indicator future demand. This may happen, at least in part, because processor utilization depends on the inputs to an executing program and for many executing programs, the future values of input data are unpredictable.

DETAILED DESCRIPTION

In certain specific classes of applications, the processor utilization behavior of a program does not vary significantly from one run to another. One specific class of applications that meets this criteria includes programs that run on exactly the same data over and over again. In one instance, a software Compact Disc (CD) player that plays back an audio CD on a computer would be likely to present a very similar processor utilization profile each time the same CD was played by the application. In another, a decoder for data encoded in one of the widely used Motion Pictures Experts Group (MPEG) formats such as MPEG Layer 2, (MPEG 2) would be likely to exhibit the same processor utilization behavior each time it was used to decode the same set of MPEG 2 data. Specifically a software application to decode and play back a video Digital Versatile Disc (DVD-Video) would be likely to exhibit the same processor utilization profile each time the same DVD-Video was played on a specific system, given that no other application on the system was contributing significantly to processor load.

Figure 4:
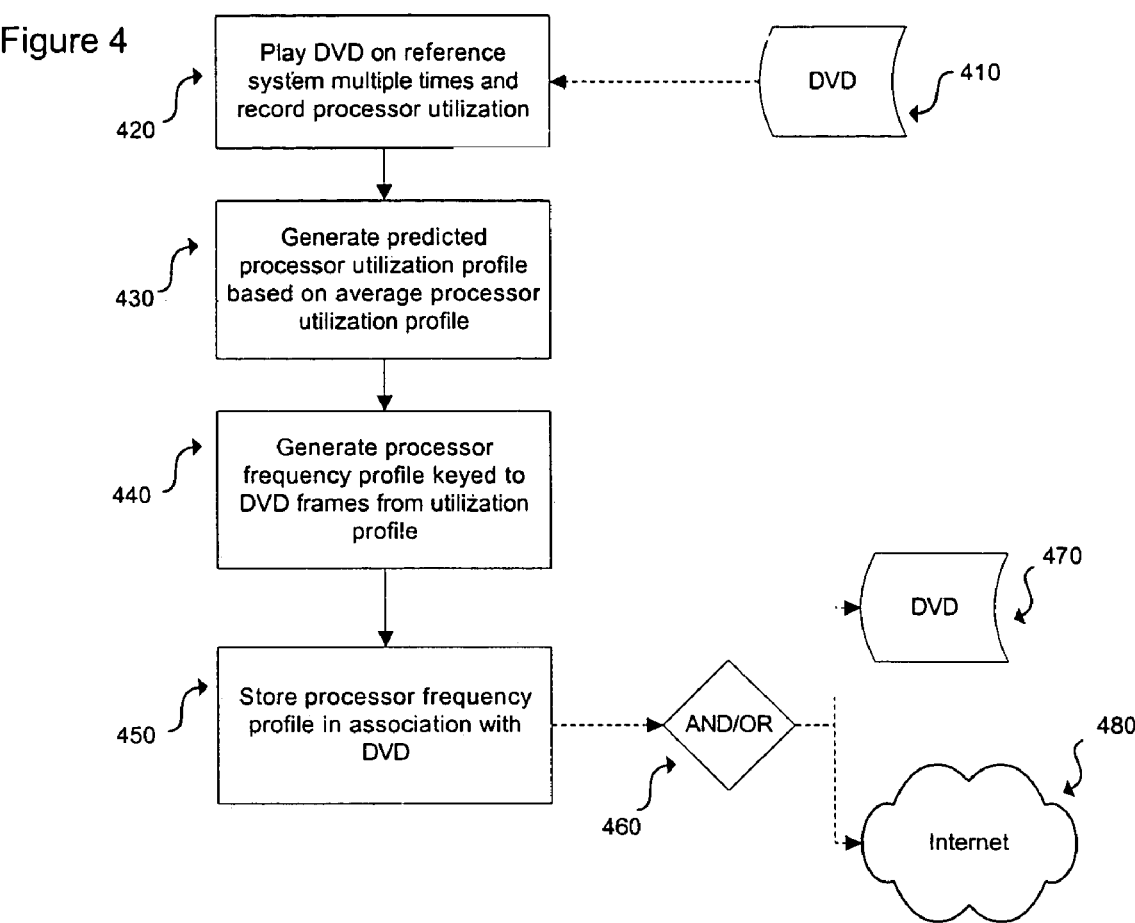
FIG. 4 is a high level flowchart of a process to generate a processor frequency profile in one embodiment.

In one embodiment, a reference processor-based system is used as in FIG. 4 to generate a predictive performance profile for an application, executing on the system, that is decoding and playing a DVD-Video. Such a system could in one embodiment be a laptop using Intel Centrino® Mobile Technology, based on an Pentium® M processor with Intel SpeedStep® technology. As in FIG. 4, a specific DVD-video 410 is played, 420, on the reference system to obtain a record of processor utilization during the execution of the software related to playback of the DVD-video, including a decoder to perform MPEG 2 decoding. The reference system would in this embodiment, in general, be configured to be running no other significant load and therefore the obtained record would be a reasonably accurate representation of the processor utilization required solely for DVD-video playback for the specific disc used. This processor utilization may be repeatedly obtained over several runs for a higher level of accuracy and an average computed, 430, using any of a well known set of standard methods such as arithmetic mean computation at selected points of time of the utilization data, obtained during the various runs. It is possible to do this averaging procedure meaningfully because it is known that repeated runs of an MPEG 2 decoder on the same MPEG data produce similar or nearly identical demands on the processor as related to the time elapsed with reference to the start of the encoded audio and video data. This is because the decoder's execution must execute at a standard frame rate and decode the same data at each frame in the same way from one instance of DVD-video playback to another, as long as the disc, the system, and other loads on the system are unchanged.

In other embodiments, the reference system may be a different type of processor-based system, including a desktop system, or a game console capable of playing DVD-video. In some embodiments, the application for which processor utilization data is obtained may be an audio playback application such as an MPEG Layer 3 (MP-3) player executing on a system such as a personal digital assistant, a portable processor-based digital media player, or a wireless communicator such as a cellular phone. In some embodiments the same general technique may be used to obtain a utilization profile for another type of application that is used multiple times on the same, predetermined, data set. In yet other embodiments it may be possible to predict the processor utilization profile directly by analysis of the predetermined data set without a need to actually run the system in order to obtain the profile, especially if the processor performance and the behavior of other processes such as operating system functions executing on the system alongside the application is well characterized and understood.

Figure 1:
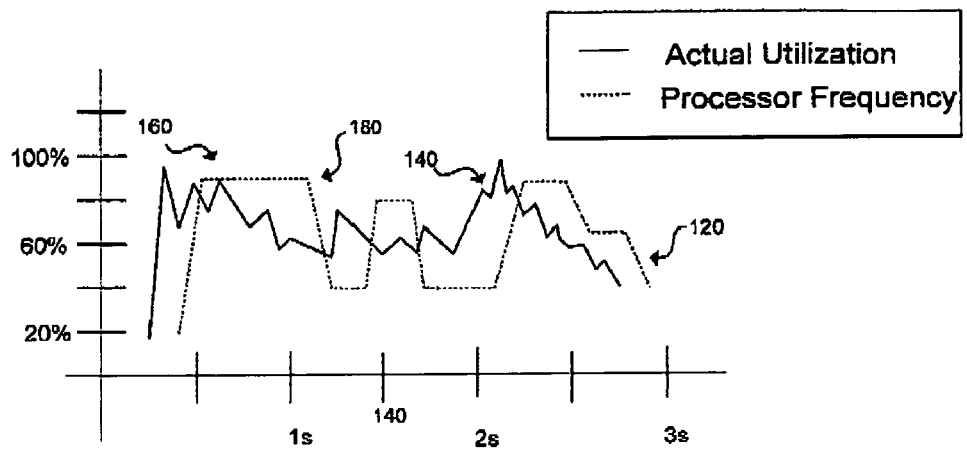
FIG. 1 depicts the response of a typical processor frequency governor in an automatic configuration to a shown utilization profile.
Figure 2:
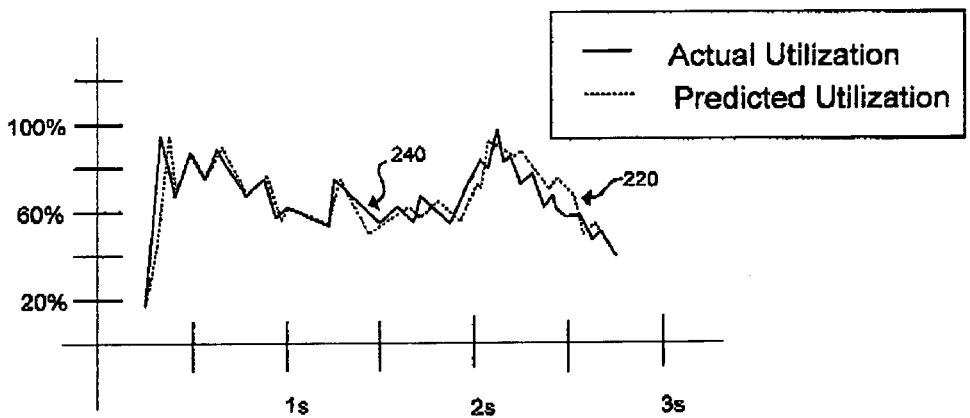
FIG. 2 shows a comparison between the actual utilization of a processor and that predicted by an averaging process based on reference runs as used in one embodiment.

The average processor utilization profile obtained as described above may now be considered a prediction of a processor demand profile for a system similar to the reference system, playing the identical DVD-video (or, in general, using the same data set) as the one used to generate the profile. FIG. 2 is a simplified figure, drawn to illustrate a typical comparison between the average processor utilization profile and the actual utilization of the processor while playing back the same disc as the one used to generate the average profile on the same system. As may be seen from the figure, the actual utilization 240 is very close to the predicted utilization 220.

Figure 3:
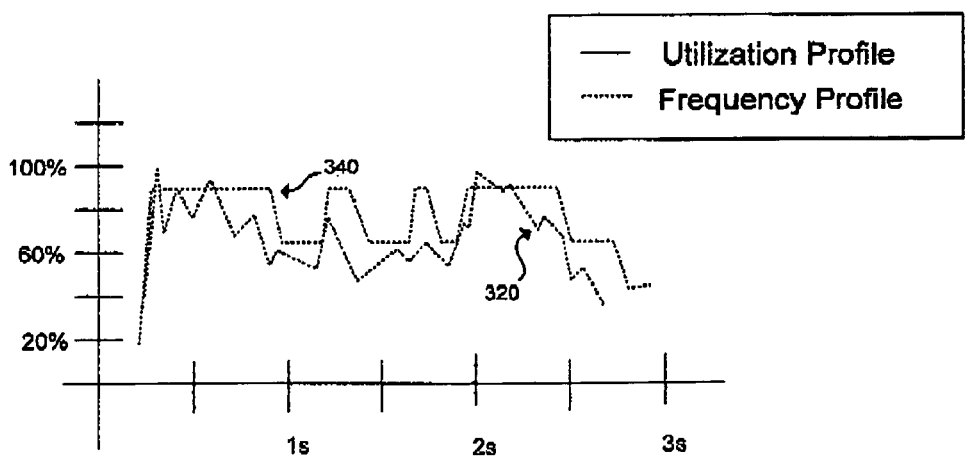
FIG. 3 depicts the response of a processor frequency governor using a performance profile to guide frequency changes as used in one embodiment.

A processor frequency profile is a simplified version of the processor utilization profile and is illustrated in FIG. 3 at 340. The frequency profile is simplified to more closely correspond to the information necessary for a processor speed governor to operate according to the predicted utilization profile 320. Processor frequency governors such as the one in the embodiment including the laptop system described above operate in a stepped manner. That is, the processor's speed is not generally varied over a continuous range of frequencies, but rather set to one of a discrete set of specific values. Thus, in general, it is not possible for such a processor's frequency to follow a utilization profile exactly because of the stepped manner of the speed governor's operation. The profile 340 is then the closest approximation to the actual utilization profile 320 obtained from the reference processor-based system, by limiting the values of the utilization curve at each point in time to the closest of the discrete values in the set of frequencies available for the speed governor. The final profile obtained by this process may be termed a performance profile.

In some embodiments, the computation of the discrete values corresponding to the predicted utilization profile may be done within the speed governor itself and the actual average utilization profile may be directly used as the performance profile. In other embodiments, the processor speed governor may not be limited to discrete values but may be able to vary the processor frequency over a continuous range and therefore be able to use the actual average utilization profile as the predicted performance profile for the processor.

As depicted in FIG. 4, a processor frequency profile is generated from a predicted processor utilization profile in step 440. In embodiments related to playback of DVD-Video, the performance profile may be stored, 450, on either the disc 470 with the video and audio data itself, and/or, 460, in other embodiments at a server at a network location such as a specific Internet site 480 accessible from a device communicatively coupled to the Internet. In some embodiments the performance profile may be available at both locations. Other locations for storage of the performance profile may include, in some embodiments, a storage device such as a hard disk drive internal to the processor-based system, or a non-volatile memory subsystem such as flash memory. In each case, some method of at least approximately synchronizing the profile to the execution of the program may be used. In the DVD-video embodiment, the profile may be time-keyed to the audio and video MPEG data on the disk, or keyed to the frames of video, as is known in the art.

In some embodiments, no performance profile that exactly matches a particular system's hardware and software configuration, or the particular set of data on which the system is executing, may exist. However, in such embodiments, the system may search a database including a number of previously generated performance profiles for a close match to either the system hardware, system software, or the data set to select an approximately-matched profile from the stored performance profiles in the database. Furthermore, in some embodiments, a system may post a performance profile obtained by executing an application on a data set to a database.

Figure 5:
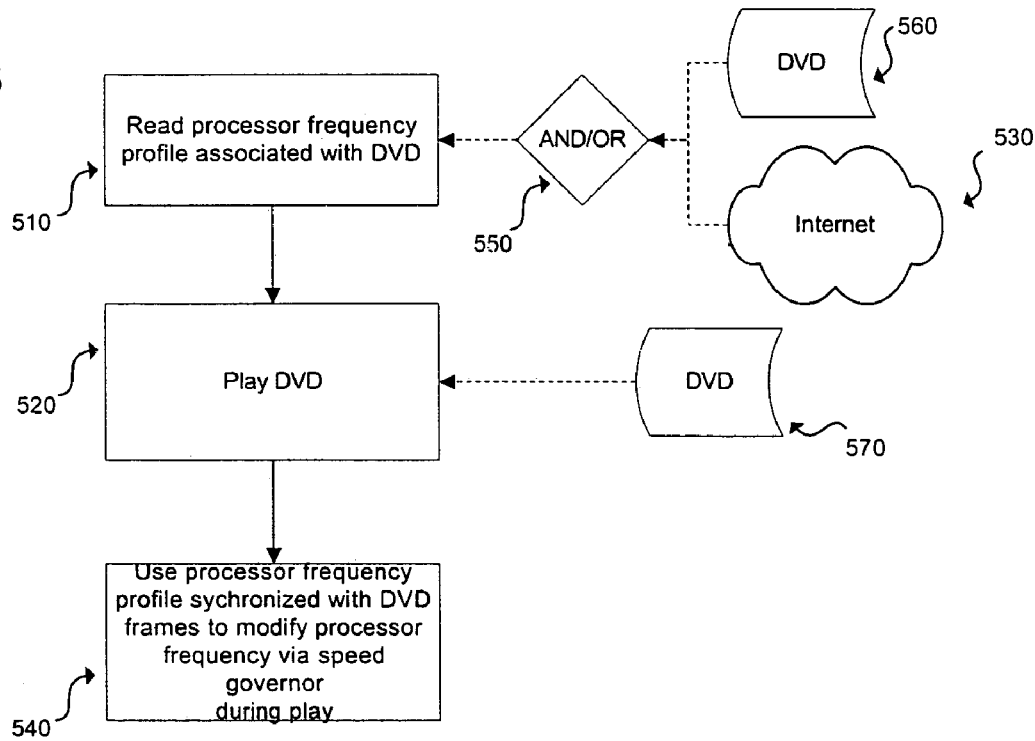
FIG. 5 is a high level flowchart of a process to use a processor frequency profile to govern processor frequency in one embodiment.

When an application such as a DVD-Video player executes, it may then use the predicted performance profile obtained to improve the effectiveness of a processor speed governor, and thus in turn the power performance of the system. In FIG. 5, the high level operation of a DVD-Video player embodiment is illustrated. The processor-based system such as a laptop or game console first reads 510 the stored processor performance profile either from the DVD 560 or from a network such as the Internet. In some instances, it may be possible for the system to alternatively retrieve a performance profile stored on the Internet for some DVD-Videos and/or one stored with the DVD-video for others, 550.

During playback the application executes to decode the MPEG data and display it in the standard way, accessing the MPEG and other data 570 to play the DVD-Video 520. The playback is accompanied by variations in processor frequency as dictated by the predicted performance profile synchronized with the DVD-video being played, and thus the system changes the processor frequency, 540, as the DVD-video plays, approximately synchronously with the expected processor utilization as discussed above with reference to FIG. 3.

Currently available, automatically controlled, processor frequency governors such as that exemplified by the Intel Pentium® M processor with Intel SpeedStep® Technology that are based on responding to current processor utilization as are known in the art, generally operate under complete control of the operating system. In the case of a frequency governor that is controlled in accordance with a performance profile as described in the embodiments discussed here, however, the processor frequency is generally controlled by the program that is executing, such as a DVD player or other application, in a manner that follows the predicted processor performance profile for the application. The program may do so in some embodiments by accessing a processor speed control interface such as an Application Programming Interface (API) to the speed governor exposed by the operating system to modify processor speed in accordance with a performance profile.

While some of the discussion above has centered on a frequency-based predicted performance profile, in some embodiments the performance profile used by the application-sensitive speed governor system may be an average utilization profile, expressed for example in terms of the percentage of processor capacity utilized at any given time during the period of execution of the application. Such a utilization profile may be translated by the processor frequency controlling application into a corresponding frequency profile, either to a range of discrete values or to a continuous scale, depending on the characteristics of the speed governor in the underlying hardware, and on the API to the speed governor, in different embodiments.

In some embodiments the methods and systems described may be adapted to parameters other than basic clock frequency that affect processor performance and power consumption. These may include clock frequencies of specific parts of the processor, or those of other subsystems outside the processor, or of peripheral devices. Similar techniques may also be used to reduce actual power provided to either parts of a processor or to other devices in a system.

Embodiments may be provided as a computer program product that may include a machine-readable medium having stored thereon data which when accessed by a machine may cause the machine to perform a process according to the claimed subject matter. The machine-readable medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions. Moreover, embodiments may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the invention but to illustrate it. The scope of the claimed subject matter is not to be determined by the specific examples provided above but only by the claims below.

What is claimed is:

1. A method comprising:
   accessing a performance profile for a program executing on a predetermined data set, the performance profile based at least in part on the predetermined data set;
   executing the program on the predetermined data set; and
   governing processor speed of a processor-based system during execution of the program in a predictive manner, based at least in part on the performance profile, wherein governing processor speed in a predictive manner further comprises performing a change in processor speed consistent with, and substantially synchronized with, a predicted change in required processor speed for the executing application, the predicted change based at least in part on the performance profile; and
   wherein the performance profile is obtained by executing the program on the predetermined data set a plurality of times on a reference processor-based system;
   recording the utilization profile of a processor of the reference processor-based system during each execution of the program; and
   computing the performance profile based at least in part on an average of the recorded utilization profile.

2. The method of claim 1 wherein processor speed further comprises processor frequency.

3. The method of claim 2 wherein the predetermined data set comprises encoded audio and video data and the program comprises a decoder for the encoded audio and video data.

4. The method of claim 3 wherein the encoded audio and video data comprises data encoded in an MPEG format and the program comprises a decoder for the MPEG format.

5. The method of claim 4 wherein the data encoded in an MPEG format is stored on a DVD.

6. The method of claim 5 wherein:
   the processor-based system is communicatively coupled to a network; and
   the performance profile is stored on at least one of:
      the DVD and
      a server accessible via the network.

7. The method of claim 2 wherein:
   the processor-based system is communicatively coupled to a network;
   the predetermined data set is stored on a data storage medium, and
   the performance profile is stored on at least one of:
      the data storage medium and
      a server accessible via the network.

8. A system comprising:
   a processor to execute programs of the system;
   a storage device, communicatively coupled to the processor to store on a medium a predetermined data set; and
   store on the medium a performance profile for a program executing on the predetermined data set;
   a program of the system to
      access the performance profile from the medium; and
      execute the program on the predetermined data set; and
   a processor speed governor to govern processor frequency in a predictive manner based at least in part on the performance profile.

9. The system of claim 8 wherein the medium readable by the storage device comprises a DVD.

10. A machine readable medium having stored thereon data which when accessed by a machine causes the machine to perform a method, the method comprising:
    a processor-based system accessing a performance profile for a program executing on a predetermined data set, the performance profile based at least in part on the predetermined data set;
    executing the program on the predetermined data set; and
    governing processor speed of a processor-based system during execution of the program in a predictive manner based at least in part on the performance profile, wherein governing processor speed in a predictive manner further comprises performing a change in processor speed consistent with, and substantially synchronized with, a predicted change in required processor speed for the executing application, the predicted change based at least in part on the performance profile;
    and wherein the performance profile is obtained by:
       executing the program on the predetermined data set a plurality of times on a reference processor-based system;
       recording the utilization profile of a processor of the reference processor-based system during each execution of the program; and
       computing the performance profile based at least in part on an average of the recorded utilization profiles.

11. The machine readable medium of claim 10 wherein processor speed further comprises processor frequency.

12. The machine readable medium of claim 11 wherein the predetermined data set comprises encoded audio and video data and the program comprises a decoder for the encoded audio and video data.

13. The machine readable medium of claim 12 wherein the encoded audio and video data comprises data encoded in an MPEG format and the program comprises a decoder for the MPEG format.

14. The machine readable medium of claim 13 wherein the data encoded in an MPEG format is stored on a DVD.

15. The machine readable medium of claim 14 wherein:
the processor-based system is communicatively coupled to a network; and
the performance profile is stored on at least one of:
the DVD; and
a server accessible via the network.

16. The machine readable medium of claim 11 wherein:
the processor-based system is communicatively coupled to a network;
the predetermined data set is stored on a data storage medium, and
the performance profile is stored on at least one of:
the data storage medium and
a server accessible via the network.

17. A method comprising:
determining a plurality of processor utilization profiles for a processor executing a program on a processor-based system;
determining an average utilization profile for the processor-based at least in part on the plurality of processor utilization profiles; and
computing a performance profile for the processor based at least in part on the average utilization profile by mapping average utilization at a point in time to a desired frequency of the processor.

18. The method of claim 17 wherein mapping average utilization at a point in time to a desired frequency of the processor further comprises mapping average utilization at the point in time to one of a discrete set of frequencies of the processor.

19. A machine readable medium having stored thereon data which when accessed by a machine causes the machine to perform a method, the method comprising:
determining a plurality of processor utilization profiles for a processor executing a program on a processor-based system
determining an average utilization profile for the processor-based at least in part on the plurality of processor utilization profiles; and
computing a performance profile for the processor-based at least in part on the average utilization profile by mapping average utilization at a point in time to a desired frequency of the processor.

20. The machine readable medium of claim 19 wherein mapping average utilization at a point in time to a desired frequency of the processor further comprises mapping average utilization at the point in time to one of a discrete set of frequencies of the processor.

* * * * *